United States Patent [19]

Hersh

[11] 4,021,069
[45] May 3, 1977

[54] APPARATUS FOR REDUCING AERODYNAMIC DRAG

[75] Inventor: Alan S. Hersh, Sepulveda, Calif.

[73] Assignee: Nose Cone Manufacturing Co., Inc., La Habra, Calif.

[22] Filed: Sept. 29, 1975

[21] Appl. No.: 617,870

Related U.S. Application Data

[63] Continuation of Ser. No. 479,043, June 13, 1974, abandoned.

[52] U.S. Cl. .............................................. 296/1 S
[51] Int. Cl.² .......................................... B60J 1/04
[58] Field of Search ..................................... 296/1 S

[56] References Cited

UNITED STATES PATENTS

| | | | |
|---|---|---|---|
| 1,648,505 | 11/1927 | Persu | 296/1 S |
| 2,514,695 | 7/1950 | Dempsey | 296/1 S |
| 3,241,876 | 3/1966 | Saunders | 296/1 S |
| 3,425,740 | 2/1969 | DeVaughn | 296/1 S |
| 3,814,472 | 6/1974 | Zelikovitz | 296/1 S |

Primary Examiner—Robert R. Song
Attorney, Agent, or Firm—Fulwider, Patton, Rieber, Lee & Utecht

[57] ABSTRACT

Aerodynamic drag reducing apparatus for mounting on the bluff, forward face of the trailing element of an over the road vehicle. The apparatus comprises a contoured member carried on the forward face and extending outwardly therefrom with its point of maximum extension substantially aligned for impingement by an air stream. The portion of the surface displaced above the point of maximum extension describes a perturbed paraboloid of revolution with the rearward portions of the apparatus describing three sides of rectangle for aerodynamic merging with the top and side edges of the trailing element.

12 Claims, 4 Drawing Figures

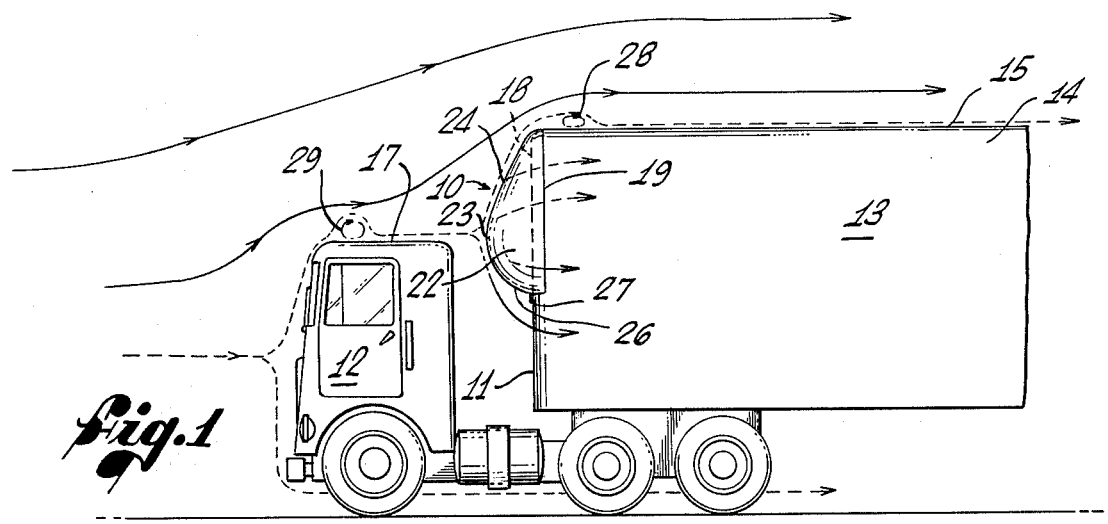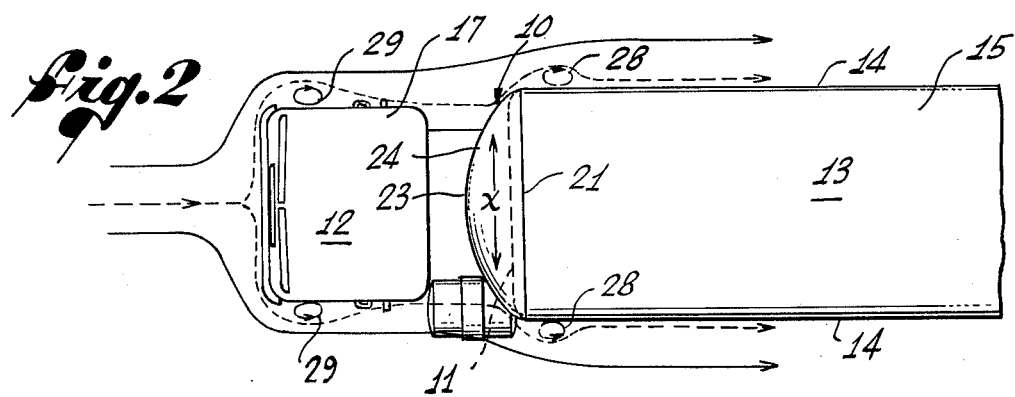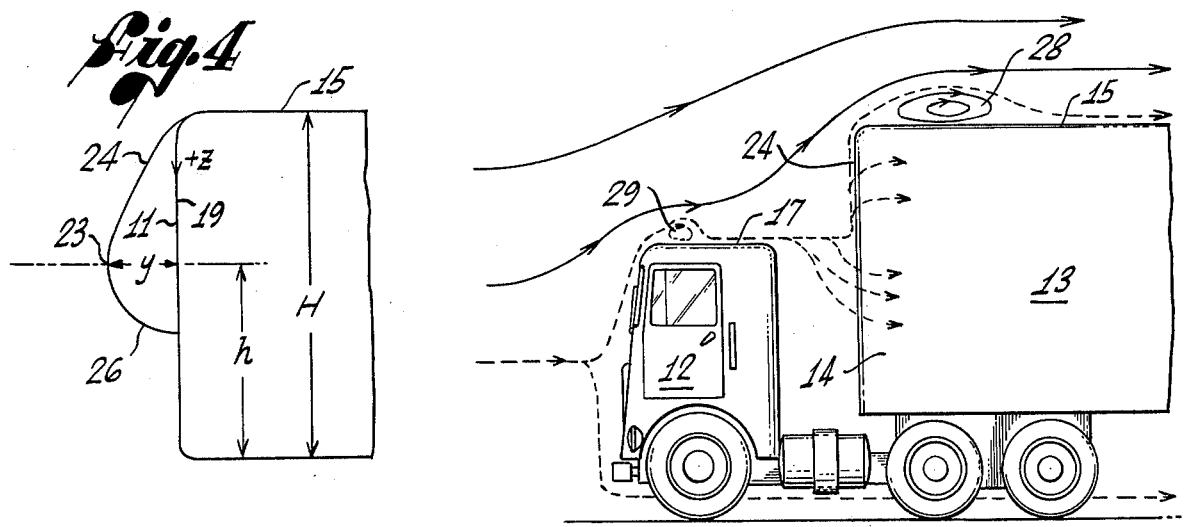

APPARATUS FOR REDUCING AERODYNAMIC DRAG

This is a continuation of application Ser. No. 479,043, filed June 13, 1974 now abandoned.

BACKGROUND OF THE INVENTION

This invention relates to apparatus for reducing the aerodynamic drag of a moving vehicle and more particularly to apparatus for reducing the air drag on tracks, trailer trucks and other similar vehicles which present a substantially broad aerodynamically resistant surface in the direction of travel of the vehicle.

In the case of trucks, trailers and other similar vehicles, the optimum useful space within the load bearing portion of the vehicle is achieved when the body of the vehicle is substantially rectangular or box-like in shape. When utilizing such a shape, however, the forward face or surface of the vehicle presents an aerodynamically resistant surface which results in a high aerodynamic drag when the vehicle is moving, particularly at speeds in excess of 50 mph. The aerodynamic resistance of the vehicle results in increased operating costs and can substantially reduce the handling characteristics of the vehicle particularly in quartering winds and crosswinds. Modifying the forward face of the cargo portion of the vehicle, such as in "round nose trailers," has been notably unaccepted by the trucking industry because of the reduction in useful cargo space.

Various prior art devices have been suggested which are adapted to be carried either by the trailing element or cargo body of the vehicle or for mounting on the cab of the vehicle for deflecting impinging air around the cargo body to reduce the aerodynamic drag. Thus, for example, Saunders in U.S. Pat. No. 3,241,876 suggests the placing of a baffle on the cab of the vehicle which deflects air upwardly over the cargo holding portion of the vehicle. Such apparatus requires reinforcement of the cab roof and is substantially of no help in improving the handling characteristics of the vehicle in crosswind. U.S. Pat. No. 697,120, also Saunders, discloses a device which is utilized in the gap between a tractor and trailer to reduce crosswind drag. This device may be utilized in combination with the air deflection baffle disclosed in U.S. Pat. No. 3,241,876 to reduce the air resistance of the vehicle in both head winds and crosswinds.

Kerrigan in U.S. Pat. No. 3,415,566 proposes a rectangularly shaped, open receptacle which is carried on the front wall of the cargo body and which traps air to produce an air buffer for diverting impinging air around the vehicular body. This device is of substantially no value in a crosswind.

Other drag reducing apparatus employed in the prior art includes the provision of air vanes or fins around the edges of the cargo carrying portion of the vehicle to deflect the impinging air stream. Operating on a different principle is a device disclosed by Dempsey in U.S. Pat. No. 2,514,695 which comprises a substantially larger blister carried on the forward face of a trailer and which blister is provided with an opening for collecting impinging air, and conduit means extending along the trailer and exiting at the rear porton of the trailer for conducting the collected air. This device requires a substantial modification of the trailer.

De Vaughn, U.S. Pat. No. 3425,740 also discloses a contoured blister which is designed to be carried on the forward face of a house trailer and which is movable between an extended awning position and a traveling position. The design of the DeVaughn device presents a substantial overhang from the front of the trailer which is unacceptable for commercial vehicles.

Other prior art devices include means for enclosing the gap between the tractor and trailer of an articulated cargo carrying vehicle to reduce the resistance of the combination. Such devices restrict vehicular operation, particularly the turning radius, and are unacceptable for commercial vehicles.

The prior art devices, although successful in varying degrees in reducing the aerodynamic resistance of a vehicle, are deficient to the extent that either substantial modifications of the vehicle are required in order to employ the devices, or it is necessary to use several devices in combination in order to achieve reduction of aerodynamic resistance in both a head flow and cross flow of air with respect to the vehicle, thereby substantially increasing the cost of air resistance reduction. The present invention represents an improvement over the prior art in that apparatus is provided for mounting on the forward face of the trailing element of a vehicle which reduces the aerodynamic resistance of a vehicle both in a cross flow and head flow situation. The apparatus of the present invention requires substantially no modification of the vehicle and is acceptable for use on commercial vehicles.

SUMMARY OF THE INVENTION

The present invention resides in a fairing element which is designed to be carried on the forward face of a bluff body, such as a box-like trailer or cargo body of a truck. The fairing element is provided with an extending surface which is contoured for the deflection of impinging air streams both from a head on and from a quartering and crosswise direction, thereby to substantially reduce the air resistance of the vehicle and to substantially improve its handling characteristics. The apparatus of the present invention is adapted for ready mounting on the vehicle with no modification of the vehicle being necessary.

To these ends, the apparatus of the present invention comprises a fairing element adapted to cover at least an upper portion of the bluff, forward face of a cargo vehicle. The apparatus is provided with a contoured outer surface which extends away from the forward face for deflection of an impinging air stream. The contoured outer surface is continuous so that the upper portion of the forward face of the vehicle is enclosed. The contour of the outer surface from the point of maximum extension of the fairing element upwardly and outwardly to the vehicle sides is described as a perturbed paraboloid of revolution. The top, bottom and side edges of the fairing element, instead of describing an ellipse, as would be the case of a precise parabola, describe a rectangle and are adapted for aerodynyamically merging with the top edge and side edges of the vehicle. The surface portion of the fairing element extending below the point of maximum extension may be of any suitable configuration, depending upon the type of vehicle on which the fairing element is mounted.

More detailed features of the fairing element are found in the ease of installation, the non-interference of vehicular operation and in the adaptability of the apparatus to vehicles of varying sizes. Other aspects and advantages of the invention will become apparent from the following detailed description taken in conjunction with the accompanying drawings.

BRIEF DESCRIPTION OF THE DRAWINGS

FIG. 1 is a side elevation of the apparatus of the present invention carried on the forward face of a cargo carrying vehicle of the articulated type, with portions of the trailing element broken away for compactness of illustration;

FIG. 2 is a top plan view of a cargo carrying vehicle having the apparatus of the present invention installed thereon, with portions of the trailing element broken away for compactness of illustration;

FIG. 3 is a side elevation of an articulated cargo carrying vehicle without the apparatus of the present invention and showing the flow of air from a head on direction, portions of the trailing element being broken away from compactness of illustration; and FIG. 4 is a schematic side elevational showing the apparatus of the present invention and illustrating dimensional symbols, a portion of the vehicle being broken away for compactness of illustration.

DETAILED DESCRIPTION OF THE INVENTION

As shown in the drawings, the invention is embodied in a fairing 10 which is adapted to be mounted on a vehicle of the cargo carrying type for modifying the flow of air when the vehicle is traveling to substantially reduce the aerodynamic drag and improve the handling characteristics of the vehicle. As illustrated, the vehicle includes a tractor 12 and a trailing, cargo vehicle 13 presenting an aerodynamically resistant forward surface to an impinging stream of air. Although, for the purposes of illustration, the vehicle described herein is of the tractor, semi-trailer type where the cargo vehicle is separated from the tractor, it should be clear that the present invention is operable on single chassis vehicles such as, for example, the socalled bob-tail trucks.

As is more specifically shown in FIGS. 1 and 2, the cargo vehicle 13 is of a generally box-like configuration having a forward wall 11, side walls 14 and upper wall 15 defining an enclosure for cargo and the like. The tractor 12 includes a cab 16 having an upper surface 17 which is disposed at a lower elevation that the upper wall 15 of the cargo vehicle. A portion 18 of the forward wall extending above the upper surface of the tractor is primarily responsible for most of the aerodynamic drag of the vehicle, while skin friction, that is, the resistance of air passing the side and top walls of the cargo vehicle, is negligible.

The fairing element 10 is disposed over at least the extending portion 18 of the forward wall 11 much as in the manner of an aircraft nose cone, so as to present a streamlined forward surface for the cargo vehicle 13. The fairing element includes substantially linear side and top edges 19 and 21, respectively, which overlie the top and side edges of the top and side edges of the forward wall for aerodynamically merging the edges of the forward wall, the side walls 14 and upper wall 15 of the cargo vehicle. The fairing member is provided with a continuous surface which is contoured away from the front wall 22 to a point of maximum extension 23. An upper portion 24 of the contoured outer surface lying above the horizontal plane of the point of maximum extension is described as a perturbed paraboloid of revolution. By perturbed paraboloid of revolution, it is meant that the upper portion of the contoured surface is paraboloid at the point of maximum extension and is constrained into the linear side and top edges, so that the side and top edges cooperate to define three sides of a rectangle.

A lower portion 26 of the contoured surface 22 lying below the horizontal plane of the point of maximum extension 23 is of any suitable contour, since it does not play a significant role in air drag reduction in accordance with the present invention. The lower portion of the surface serves mainly to enclose the area between the forward wall 11 and the fairing 10 so as to avoid entrapment of air between the fairing element and the forward wall. When the fairing is mounted on single chassis vehicles, the lower portion of the surface may be also contoured to describe a perturbed paraboloid of revolution. The lower portion terminates in a downwardly turned bottom flange 27 which is contiguous with the forward wall of the cargo vehicle 13.

The location of the point of maximum extension 23 with respect to the vertical axis of the cargo vehicle 13 and the nature of the contour of the upper portion 24 of the surface 22 are important features of the fairing 10 of the present invention. Preferably, the point of maximum extension is located with respect to the vertical axis of the cargo vehicle substantially at the point where an airstream impinges on the forward face of the cargo vehicle when in motion. This stream of air, referred to hereinafter as the stagnation stream surface, is shown in broken line in FIGS. 1 and 3. As is illustrated, in the case of a semi-trailer, this is a point theoretically slightly above the upper surface 17 of the tractor 12. However, as a practical matter, the height of the tractor may vary depending on the make and design of the tractor pulling the semi-trailer, since the same tractor is not always used to pull the same trailer. Consequently, the location of the point of maximum extension along the vertical axis of the cargo vehicle is generally set to substantially correspond with the height of the lowest tractor utilized with the cargo vehicle. Good results are obtained even when the point of maximum extension is located below the upper surface of the tractor. In the case of single chassis vehicles, the location of the point of maximum extension is governed by the same principles, although it cannot be located below the upper surface of the cab due to the design of the vehicle.

As is shown in FIG. 4, the upper portion 24 of the surface 22 of the fairing element 10 describes a perturbed paraboloid of revolution. The surface at the point of maximum extension 23 is mathematically described by the following formula for a paraboloid of revolution:

$$Y = Y_{max}\left[1-\left(1-\frac{z}{H-h}\right)^2\right]\left[1-\left(\frac{x}{w/2}\right)^2\right]$$

Wherein $Y_{max}$ is a distance in inches of the maximum extension 23 from the forward wall 11; $z$ is the vertical distance in inches from a point on the surface to the top wall 15; $H$ is the total vertical distance in inches from the top surface to the bottom of the cargo vehicle; $h$ is the vertical distance in inches from the bottom of the cargo vehicle to the location of the point of maximum extension taken along the vertical axis of the cargo vehicle; $x$ is the transverse distance in inches from the midpoint of the forward face; and $w$ is the total width in inches of the cargo vehicle. The surface is gradually constrained from the paraboloid configuration to a planar configuration so that the side edges 19 and top edge 21 are substantially linear.

In accordance with the formula, the point of maximum extension is located when $Y_{max}$ equals Y, Z equals H-$h$ and X = 0.

An important consideration in the design of fairing element 10 of the present invention is that it must not interfere with the operation of the vehicle, particularly the vehicular turning radius. For this reason, the dimension $Y_{max}$ will vary depending on the cargo vehicle design and swing radius and the location of the king pin. It has been found that $Y_{max}$ may vary between 16 and 24 inches with most conventional semi-trailers. With single chassis vehicles, $Y_{max}$ is determined primarily so that the fairing does not interfere with the exhaust system of the vehicle.

It should be clear, however, that once having determined $Y_{max}$ based on the design characteristics of the vehicle on which the fairing 10 is to be mounted, the remainder of the upper portion 24 of the surface 22 is configured as described above.

The principle of operation of the fairing element of the present invention is most clearly illustrated in connection with a headwind, that is, when the stagnation stream surface is impinging substantially normal to the forward wall 11 of the cargo vehicle 13. As is more specifically shown in FIG. 3, a vehicle of the semi-trailer type without the fairing element of the present invention is illustrated. As the vehicle passes through an air stream, a portion of the air, solid line, is deflected over the vehicle. The stagnation stream surface, broken line, impinges on the tractor 12 and is deflected into two streams. One stream passes beneath the vehicle and is of no consequence with respect to the present invention. A second stream is deflected upwardly over the upper surface 17 of the tractor and impinges on the extending portion 18 forward wall of the cargo vehicle. The flow of air around the junction of the upper wall 15 and side walls 14 forms a horseshoe shaped eddy or separation bubble, shown schematically as 28, which is generally located at forward areas of the top and side walls of the cargo vehicle. This bubble is formed because in the process of turning around the relatively sharp corners of the cargo vehicle, the air flow over-accelerates beyond its incident value far upstream of the truck, and once having rounded the corners of the trailing element, the flow decelerates. This deceleration occurs abruptly, creating a large adverse pressure gradient which deflects the flow laterally away from the surface to create the bubble. The bubble acts to considerably increase the apparent frontal area of the cargo vehicle and to substantially increase the aerodynamic drag.

It should be noted that a smaller bubble 29 is likewise formed at the tractor. The present invention has no effect on the formation of the bubble 29.

As shown in FIGS. 1 and 2, the same vehicle having the fairing element 10 of the present invention mounted on the forward wall 11 of the cargo vehicle 13 in accordance with the present invention is shown with the stagnation stream suface, broken line, passing over the upper surface 17 of the tractor and impinging on the fairing element substantially at the point of maximum extension 23. The fairing element acts to reduce considerably the magnitude of the air acceleration around the junction of the upper wall 15 and side walls 14, thereby substantially reducing the magnitude of the adverse pressure gradients and reducing the resulting size of the separation bubble 28. With the smaller size bubbles, the apparent frontal area of the trailing element is substantially reduced, thus reducing the aerodynamic drag on the vehicle.

A similar effect is achieved when the direction of the stagnation stream surface is other than directly head on, that is to say, air impingement occurs at an angle to the forward wall 11 of the cargo vehicle 13. By substantially reducing the over-acceleration of the air as it passes around the cargo vehicle, the handling characteristics thereof are substantially improved.

From the foregoing, it can be seen that the present invention provides a simple and highly effective means for reducing aerodynamic drag of bluff-shaped structures such as in trucks and similar vehicles. The device is affixed to the bluff forward face of a cargo vehicle with substantially no modification of the vehicle being required. The device does not interfere with the operation of the vehicle, such as blocking air conditioning vents, covering air lines or interferring with the exhaust system of the leading element.

In operation, the device of the present invention improves substantially the fuel consumption rate and improves the handling characteristics of the vehicle. In particular, the device of the present invention may be used to reduce the sway of trailers utilizing air-ride suspension systems. The device of the present invention is efficient with both single chassis vehicles and aritculated vehicles. In particular, with the semi-trailer vehicle, the device of the present invention is efficient, regardless of the spacing between the leading and trailing elements.

I claim:

1. Apparatus for reducing the aerodynamic drag of a cargo carrying vehicle of the type having forward, side and top walls, said forward wall being contained in a substantially vertical plane disposed normal to the direction of travel of said vehicle, said apparatus comprising:

an aerodynamic fairing carried on said forward wall for directing air flow about said vehicle, said fairing including:

side and top edge portions aerodynamically shaped to merge with said top and side walls of said vehicle adjacent said forward wall thereof;

a continuous contoured outer fairing surface extending away from said side and top edges and converging at a point of maximum extension;

said fairing surface being substantially symmetrical horizontally about a central vertical plane normal to said forward wall so that air encountered during forward movement of said vehicle is directed toward both of said side walls;

said fairing surface being asymmetrical vertically, with said point of maximum extension being disposed substantially vertically below the center of said fairing, so that the upper fairing surface above said point of maximum extension is substantially longer than the lower fairing surface therebeneath;

said fairing acting to reduce air drag on said vehicle by directing air encountered by said fairing surface in such a manner that substantially all of said air flows rearwardly toward and along both sides and top of said vehicle, with the major portion normally being directed over the top.

2. The apparatus of claim 1, wherein said outer surface at said point of maximum extension is defined by the formula:

$$Y = Y_{max}\left[1-\left(1-\frac{z}{H-h}\right)^2\right]\left[1-\left(\frac{x}{w/2}\right)^2\right]$$

where
- Y is the distance from said forward wall taken perpendicular to the plane thereof;
- $Y_{max}$ is the maximum distance from said forward wall taken in a direction perpendicular to the plane thereof,
- z is the vertical distance from said point of maximum extension taken in a direction parallel to the plane of said wall;
- H is the distance from the bottom edge to the top edge of said vehicle, including said cargo portion, taken in a direction parallel to the plane of said forward wall;
- h is the distance from the bottom edge of said vehicle to the point of maximum extension taken in a direction parallel to the plane of said forward wall;
- x is the transverse distance taken from the center line of said forward wall;
- w is the transverse distance between said side walls of said cargo portion of said vehicle; and
- said surface from said point of maximum extension to said side and top edges is contoured to planar configuration.

3. The apparatus of claim 2, wherein aid point of maximum extension of said outer surface is located when:
$Y_{max} = Y$;
z = H-h; and
x = 0.

4. The apparatus of claim 3, wherein $Y_{max}$ is between about 16 and about 24 inches.

5. The apparatus of claim 1, wherein said point of maximum extension is located on said outer surface for impingement by the stagnation stream surface when said fairing is mounted on said forward wall of said vehicle.

6. The apparatus of claim 1, wherein said upper fairing surface above a horizontal plane through said point of maximum extension describes a perterbed paraboloid of revolution.

7. The apparatus of claim 6, wherein said upper fairing surface is constrained to a substantially planar shape at said top and side edges to merge with the top and side walls of said vehicle.

8. The apparatus of claim 1, wherein said vehicle is a cargo trailer adapted to be towed by a separate power unit including a cab, said aerodynamic fairing being carried on said forward wall of the cargo trailer, and wherein said point of maximum extension of said outer fairing surface is so located on said forward wall as to be in substantial vertical alignment with the top surface of the cab of a power unit when the cargo trailer is being towed.

9. The apparatus of claim 8, wherein said lower fairing surface disposed below the horizontal plane of said point of maximum extension includes an effective bottom edge extending across said forward wall between said side edges a substantial distance above the bottom edge of said forward wall.

10. The apparatus of claim 1, wherein said vehicle has a power unit including a cab and a substantially rectangular cargo portion located behind said cab, said forward wall being the forward wall of said cargo portion, and wherein said point of maximum extension of said outer fairing surface is located in substantial vertical alignment with the top surface of the cab of said power unit when said aerodynamic fairing is mounted on said forward wall.

11. The apparatus of claim 1, wherein said lower fairing surface disposed below the horizontal plane of said point of maximum extension includes an effective bottom edge across said forward wall between said side edges a substantial distance above the bottom edge of said forward wall.

12. The apparatus of claim 11, wherein said bottom edge of said fairing is substantially linear and is provided with an angularly oriented flange extending between said side edges, said flange having an inner surface which is contiguous with said forward surface of said trailing element in a direction parallel to the plane of said forward wall.

* * * * *

UNITED STATES PATENT AND TRADEMARK OFFICE
CERTIFICATE OF CORRECTION

PATENT NO. : 4,021,069
DATED : May 3, 1977
INVENTOR(S) : ALAN S. HERSH

It is certified that error appears in the above-identified patent and that said Letters Patent are hereby corrected as shown below:

Column 1, line 10 - Delete "tracks" and insert therefor --trucks--.

Column 3, line 18 - Delete "from" and insert therefor --for--.

Column 6, line 29 - Delete "aritculated" and insert therefor --articulated--.

Column 7, line 7 - After "where" insert --;-- (semicolon).

line 30 - Delete "aid" and insert therefor --said--.

Column 8, line 26 - Delete "of" (second occurrence) and insert therefor --on--.

line 34 - After "edge" insert --extending--.

Signed and Sealed this thirtieth Day of August 1977

[SEAL]

Attest:

RUTH C. MASON
Attesting Officer

C. MARSHALL DANN
Commissioner of Patents and Trademarks